United States Patent [19]
Siloti

[11] Patent Number: 5,742,239
[45] Date of Patent: Apr. 21, 1998

[54] BACKGROUND ARBITRATION MONITORING TO IMPROVE ACCESS ON LIGHTLY CONSUMED NETWORK

[75] Inventor: Alex Siloti, Yorba Linda, Calif.

[73] Assignee: MTI Technology Corporation, Anaheim, Calif.

[21] Appl. No.: 703,112

[22] Filed: Aug. 22, 1996

Related U.S. Application Data

[63] Continuation of Ser. No. 111,146, Aug. 24, 1993, abandoned.

[51] Int. Cl.⁶ ............................................. H04Q 1/00
[52] U.S. Cl. ........................ 340/825.5; 370/448; 370/457; 370/451
[58] Field of Search ................... 340/825.5; 395/158; 370/85.6, 85.3, 85.4, 85.2, 448, 451, 457, 462; 364/941.6, 941.3, 941.2, 937.01, 935.41, 242.6

[56] References Cited

U.S. PATENT DOCUMENTS

| | | | |
|---|---|---|---|
| 4,439,856 | 3/1984 | Ulug | 340/825.5 |
| 4,464,749 | 8/1984 | Ulug | 370/85.4 |
| 4,560,985 | 12/1985 | Strecker et al. | 340/825.5 |
| 4,969,120 | 11/1990 | Azevedo et al. | 364/941 |
| 5,023,891 | 6/1991 | Johnson, III | 375/87 |
| 5,175,537 | 12/1992 | Jaffe et al. | 340/825 |
| 5,202,856 | 4/1993 | Glider et al. | 365/230 |
| 5,226,010 | 7/1993 | Glider et al. | 365/189 |
| 5,233,692 | 8/1993 | Gajjar et al. | 395/325 |
| 5,315,708 | 5/1994 | Eidler et al. | 395/250 |
| 5,359,320 | 10/1994 | Jaffe et al. | 340/825 |
| 5,361,063 | 11/1994 | Jaffe et al. | 340/825 |
| 5,388,243 | 2/1995 | Glider et al. | 395/425 |

*Primary Examiner*—Brian Zimmerman
*Attorney, Agent, or Firm*—Townsend and Townsend and Crew; Larry Mendenhall

[57] ABSTRACT

A method for arbitrating for control of a network medium for transmission, combining aspects of the time slots and collision-based arbitration schemes by dynamically modifying the scheme used in accordance with network load. In a preferred embodiment, this is done by assigning time slots to the various nodes and arbitrating using the time slots when the network is free. If there are no requests for use of the network after a predefined number of time slots, any node can immediately access the network using a collision-detection method without being required to wait for a time slot arbitration procedure.

14 Claims, 3 Drawing Sheets

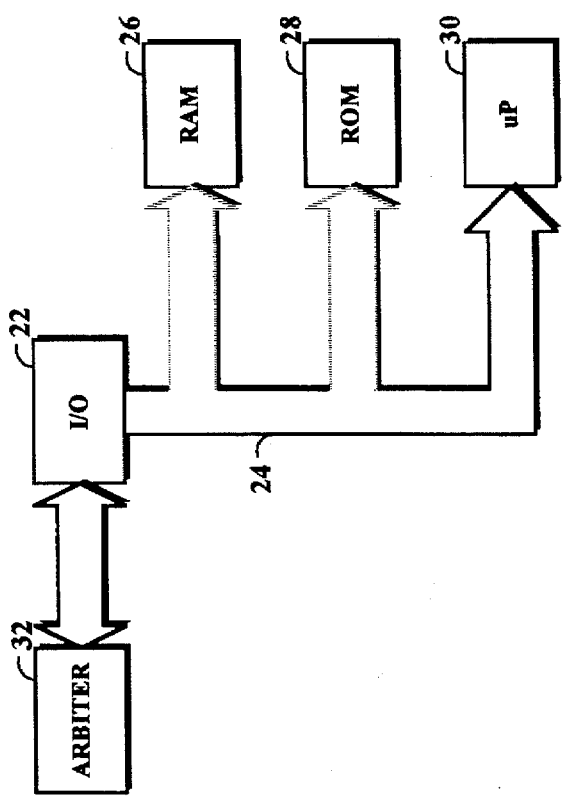
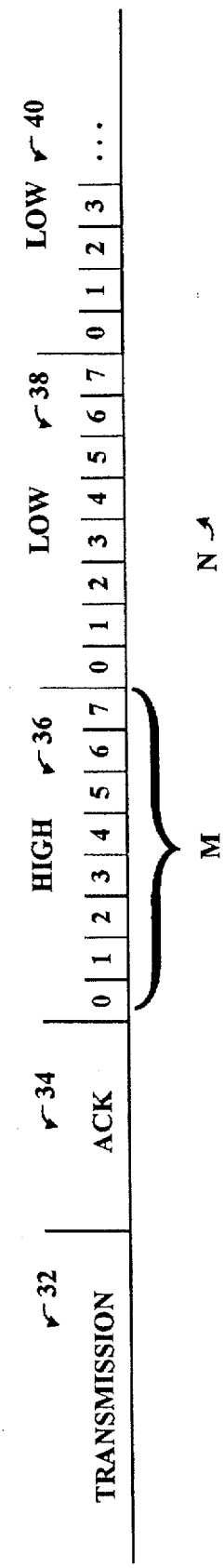
FIG. 2
FIG. 3

1

BACKGROUND ARBITRATION MONITORING TO IMPROVE ACCESS ON LIGHTLY CONSUMED NETWORK

This is a Continuation of application Ser. No. 08/111,146 filed Aug. 24, 1993, now abandoned.

BACKGROUND OF THE INVENTION

The present invention relates to arbitration schemes for access to a network.

There are two basic types of arbitration schemes: central arbitration and distributed arbitration. In a central arbitration system, a central unit controls access to the bus In a distributed system, the various nodes each contend for bus access.

The methods by which distributed contention may be done are limited by the medium. For a single line medium where there is not a separate arbitration line, the available schemes are limited. In one system, each device monitors the network for transmissions, and transmits when no other transmission is detected. This runs the risk of collision with another node transmitting at the same time. Thus, each node monitors its own transmissions to see if the data becomes garbled due to a collision. If this is so, it will delay and attempt retransmission sometime later. This type of a system is referred to as carrier-sense multiple access with collision detection (CSMA/CD). Such a system is advantageous when there is not a lot of traffic on the network, so that collisions are rare. It is advantageous because a node can quickly gain control of the network.

In another type of system, each node is assigned a time slot, and, before transmitting, puts out on the network a transmission request signal in its assigned time slot. A first such signal on the network gains priority for using the network for transmission. Such a system is advantageous for a very busy network which would otherwise have a number of collisions, but more time is required for arbitration. One disadvantage is that higher number time slots may have to wait a long time to get access to the network.

One solution to the priority problem is set forth in U.S. Pat. No. 4,560,985 assigned to Digital Equipment Corp. That patent sets forth a system with high priority and low priority time slots, with each node switching between the high and low priority slots.

SUMMARY OF THE INVENTION

The present invention marries the best aspects of the time slots and collision-based arbitration schemes by dynamically modifying the scheme used in accordance with network load. In a preferred embodiment, this is done by assigning time slots to the various nodes and arbitrating using the time slots when the network is free. If there are no requests for use of the network after a predefined number of time slots, any node can immediately access the network using a collision-detection method without being required to wait for a time slot arbitration procedure.

The present invention provides the advantage of allowing time slot arbitration to avoid collisions when the network is being contended for, while allowing faster access when the network is lightly loaded.

For a further understanding of the nature and advantages of the invention, reference should be made to the following description in conjunction with the accompanying drawings.

BRIEF DESCRIPTION OF THE DRAWINGS

FIG. 2 is a block diagram of a node in the network of FIG. 1;

FIG. 3 is a timing diagram illustrating the time slots used in the present invention.

DESCRIPTION OF SPECIFIC EMBODIMENTS

Figure 1:
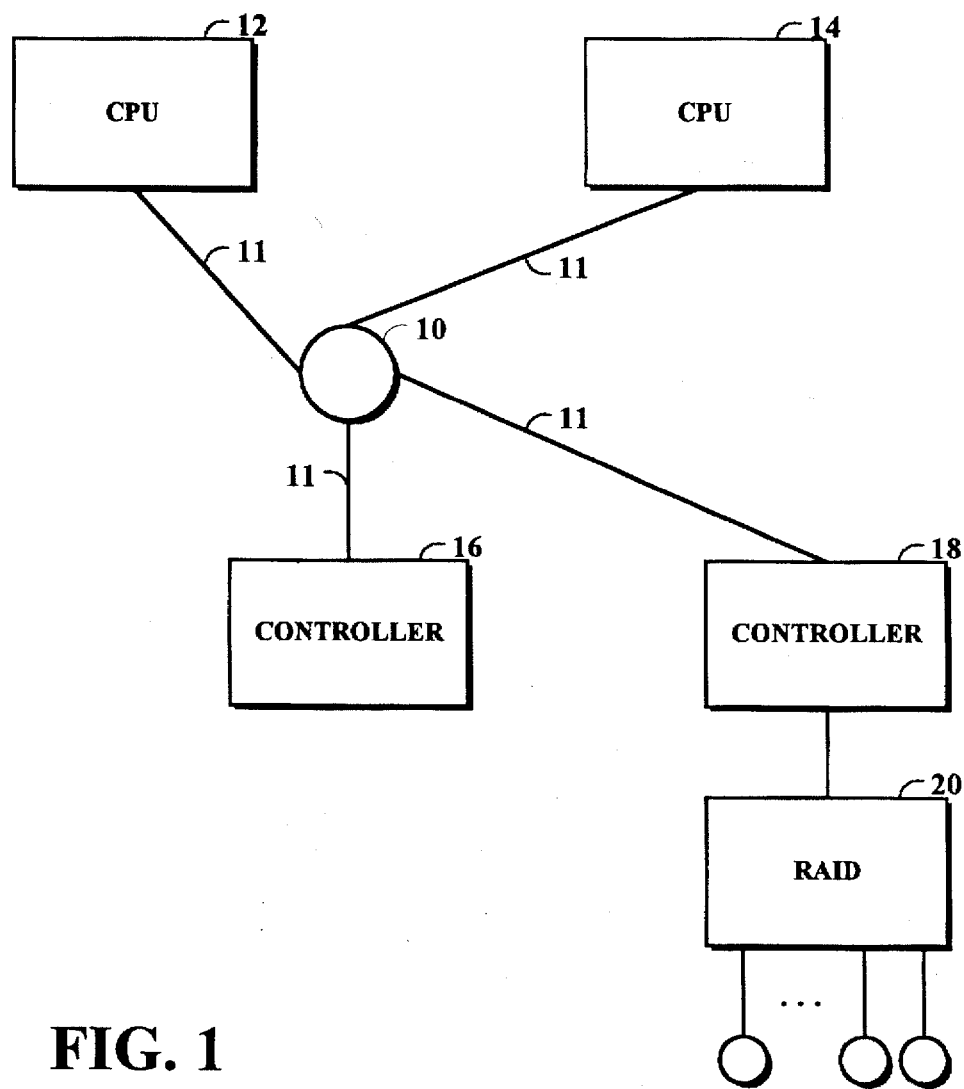
FIG. 1 is a block diagram of a typical network in which the present invention can be used.

FIG. 1 illustrates a network coupled together by a star coupler 10. This simple diagram shows a pair of central processing units (CPUs) 12 and 14. A pair of controllers 16 and 18 are also shown. Controller 18 is connected to a redundant array of inexpensive drives (RAID) 20. Medium 11 is a single line, or, in a preferred embodiment, two independent lines. These lines connect the network through star coupler 10.

FIG. 2 illustrates in block diagram form the components of a controller 18. The controller includes I/O circuit 22 coupled to the network. This is connected to an internal bus 24, which is in turn interfaced with the controller's random access memory (RAM) 26, read only memory (ROM) 28, and microprocessor 30. I/O circuit 22 is also connected to an arbitration circuit 31. An example arbitration circuit 31 is set forth in DEC Patent No. 4,560,985, which is hereby incorporated herein by reference.

FIG. 3 is a timing diagram illustrating the time slots used by the present invention. In a first period 32, an ongoing transmission between two nodes occurs. At the end of each transmission, an acknowledgement code 34 is transmitted. This acknowledgement code signals all the nodes to synchronize on the end of the transmission and start their counters to monitor their time slots. In first, high priority set-up time slots 36, eight time slots are shown in FIG. 3 (preferably, 16 would actually be used). This is followed by the same series of time slots in a low priority band 38. Thereafter, the low priority band repeats as indicated by band 40.

In the illustration of FIG. 3, eight nodes are allowed in the network, with the total number of nodes being indicated by the variable M. A particular node is assigned a particular time slot N, such as time slot 4 as shown in FIG. 3. A particular node will be able to transmit a request for control of the bus at its time slot N in either the high or the low band depending upon the current priority for that node. As can be seen, a significant delay corresponding to the total number of time slots in both the high and low band must pass before any node can begin transmission, regardless of how busy the network is.

Figure 4:
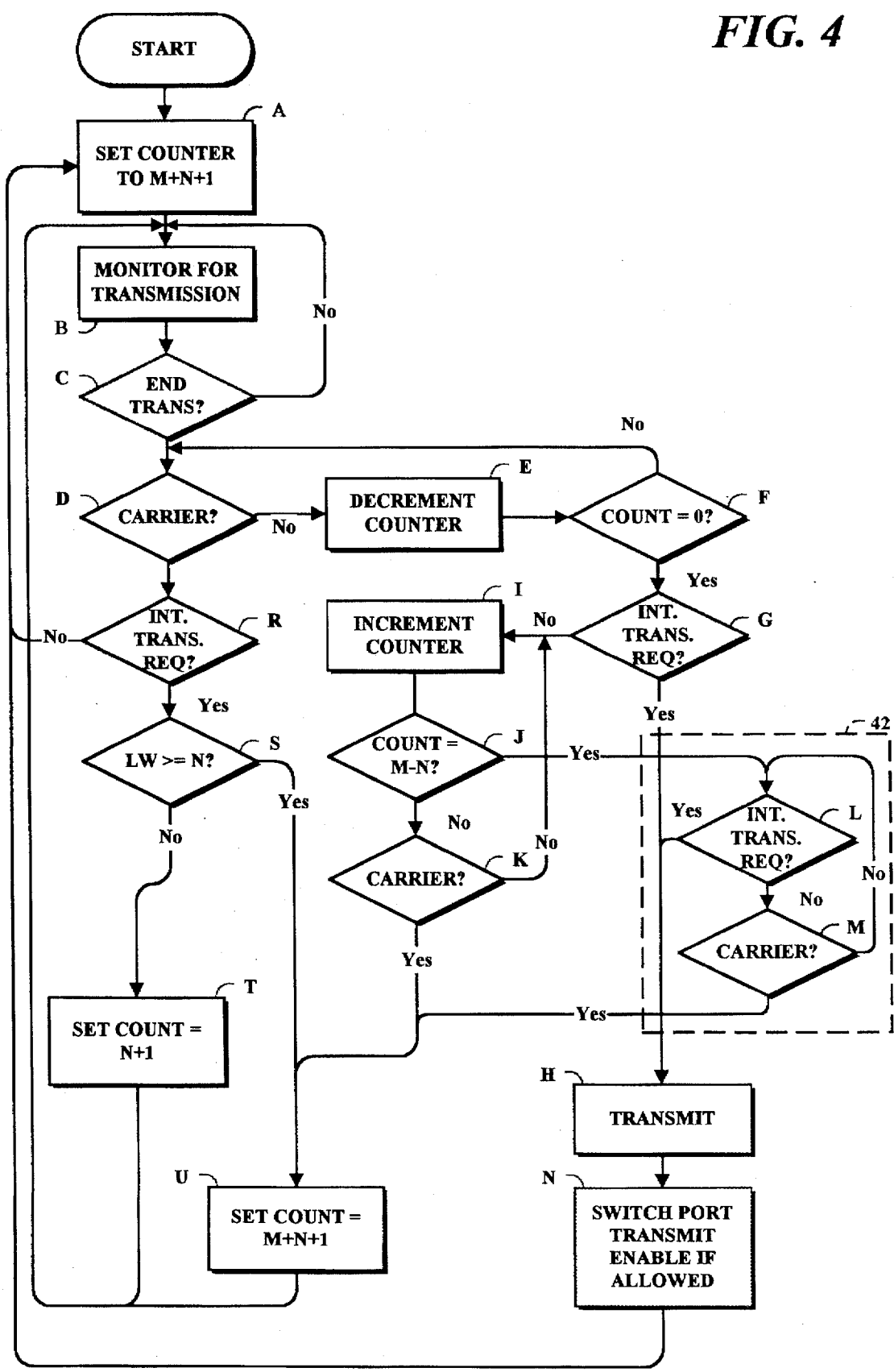
FIG. 4 is a flow chart illustrating the arbitration scheme according to the present invention.

FIG. 4 is a flow chart illustrating the operation of the present invention. Each node first sets its counter to a value equal to M+N+1 (step A). This value for the counter is its location after the end of a transmission 32 in FIG. 3, determined by adding the time of the acknowledge code (34), the time of the high band time slots (36), and the time to its particular time slot, N, in the low band 38. Each node will then monitor the transmissions on the network (step B) looking for the end of a transmission (step C) indicated by the detection of the acknowledge code.

When the acknowledge code is detected, indicating the end of a transmission, the node immediately begins monitoring for a carrier signal on the network indicating a request for control of the bus by some node (step D). This would initially be looking for a transmission in time slot 0 in the high band 36 of FIG. 3. If no carrier is detected, the counter is decremented (step E) and checked to see if it is down to zero yet (step F). This process is repeated for each time slot until the node reaches its location in the low band time slot with no carrier having been detected. At this time, the node is free to transmit. If the node has an internal transmission request (step G) it can begin transmission at this time (step H).

After a transmission, the node can switch which port it transmits on the next time to even out port usage in a two wire system (step N). The node will then return to step A. If there is a collision, no acknowledge signal will be received, and the node will attempt transmission again, starting at step A.

If there is no transmission request (the node has no need for access to the network), the node continues to monitor until the end of the low priority band of time slot periods. This is done by now incrementing the counter (step I) until the count equals M−N, which is the number of time slots following the node's time slot (step J). If a carrier is detected in this time (step K), the node which generated the carrier is allowed to take control of the network since the present node does not have an internal transmission request at the time of each time slot. The flow chart then goes back to the beginning with the counter being reset to M+N+1 (step A).

If no carrier is detected and the count reaches M−N, the node goes into an immediate transmission mode 42 in which it monitors for an internal transmission request (step L) and immediately transmits (step H) upon detecting a transmit request. However, if a carrier is detected (step M) before an internal transmission request, the node returns to the arbitration mode set forth in step A with the counter being reset to M+N+1 and the transmission being monitored for the end of transmission again.

Going back to step D of the flow chart, if the carrier is detected before the time slot of the node is reached, a check is done to see if there is an internal transmission request (step R). Since the method of the present invention does not wait for a transmission request to trigger the monitoring of the time slot, a check for an internal transmission request must be done at several other points during the arbitration routine. Here, if no transmission request is present, there is no need for the node to move to the high priority time slot band, and operation continues with the counter being reset and the monitoring of the transmission starting again.

If there is an internal transmission request, a test is done to see if the node which has won the arbitration (LW) is greater than the present node. If it is not, the present node is entitled to move up to the higher priority band, and thus its count is set to N+1 (step T). Otherwise, the count is reset at M+N+1 (step U).

As will be understood by those of skill in the art, the present invention may be embodied in other specific forms without departing from the spirit or essential characteristics thereof. For example, a time slot mechanism other than the high and low priority band mechanism described above may be used. Accordingly, the foregoing description is illustrative, but not limiting, of the scope of the invention as set forth in the following claims.

What is claimed is:

1. A method for arbitrating at a node among a plurality of nodes for control of a network medium for transmission, said node having a physical location and a logical address on said medium, said method comprising the steps of:

determining a first number of time slots for said node to monitor said medium, where said first number is a function of said logical address of said node; and determining a single second number of time slots for each of said plurality of nodes to monitor said medium,
said second number common to each of said plurality of nodes and a function of the count of said plurality of nodes;

always, immediately following the end of a transmission, monitoring said medium for said first number of time slots for a request transmission requesting control of said medium; and in the time slot following said first number of time slots, beginning a transmission if
an internal transmission request is received before the end of the time slot following said first number of time slots, and
no request transmission is detected in any of said first number of time slots;

otherwise, immediately continuing to monitor said medium for time slots numbering the difference between said first and second numbers for a request transmission requesting control of said medium if
an internal transmission request is not received before the end of the time slot following said first number of time slots; and
no request transmission is detected in any of said first number of time slots; and then beginning a transmission, without first obtaining control of said medium, if
an internal transmission request is not received before the end of the time slot following said first number of time slots but is received after the end of the time slot following said first number of time slots, and
no request transmission is detected in any of said second number of time slots.

2. The method of claim 1 wherein before said step of monitoring, the following steps are performed:

monitoring said medium for the end of a transmission; and dividing said medium into a series of time slots beginning with said end of a transmission.

3. The method of claim 1 wherein said medium comprises a pair of transmission lines, said steps being independently applied to each of said transmission lines.

4. The method of claim 1 wherein said node has a preassigned time slot and said number of time slots comprises a high priority series of time slots including said preassigned time slot and a low priority series of time slots including said preassigned time slot.

5. The method of claim 4 wherein said node sends a request transmission in said low priority series after a transmission resulting from a request in said high priority series, and sends a request transmission in said high priority series after a node with a lower assigned time slots wins an arbitration based on a request transmission sent in said high priority series.

6. The method of claim 2:

wherein said medium comprises a pair of transmission lines, said steps being independently applied to each of said transmission lines.

7. An apparatus for arbitrating at a node among a plurality of nodes for control of a network medium for transmission, said node having a physical location and a logical address on said medium, said apparatus comprising:

a first transmission monitor, coupled to said medium, for always, immediately following the end of a transmission, monitoring said medium for a first number of time slots for a request transmission requesting control of said medium, said number a function of said logical address of said node;

a first transmitter, coupled to said first transmission monitor, for beginning a transmission in the time slot following said first number of time slots if an internal transmission request is received before the end of the time slot following said first number of time slots, and if no request transmission is detected in any of said first number of time slots;

a second transmission monitor, coupled to said medium and to said first transmission monitor, for immediately continuing to monitor said medium for time slots numbering the difference between said first number and a second number for a request transmission requesting control of said medium, said second number a function of the count of said plurality of nodes, if an internal transmission request is not received before the end of the time slot following said first number of time slots and if no request transmission is detected in any of said first number of time slots; and a second transmitter, coupled to said medium and said second transmission monitor, for beginning a transmission, without first requesting control of said medium, if an internal transmission request is not received before the end of the time slot following said first number of time slots but is received after the end of the time slot following said first number of time slots, and if no request transmission is detected in any of said second number of time slots.

8. The apparatus of claim 7 further comprising:

a third transmission monitor, coupled to said medium, for monitoring said medium for the end of a transmission; and a timer, coupled to said third transmission monitor, for dividing said medium into a series of time slots beginning with said end of a transmission.

9. The apparatus of claim 7 wherein said medium comprises a pair of transmission lines, said first and second transmission monitors and transmitters acting independently on each of said transmission lines.

10. The apparatus of claim 7 wherein said node has a preassigned time slot and said number of time slots comprises a high priority series of time slots including said preassigned time slot and a low priority series of time slots including said preassigned time slot.

11. The apparatus of claim 10 wherein said node includes a transmitter, coupled to said medium and to said first transmission monitor, for sending a request transmission in said low priority series after a transmission resulting from a request in said high priority series and sending a request transmission in said high priority series after a node with a lower assigned time slot wins an arbitration based on a request transmission sent in said high priority series.

12. The apparatus of claim 8 wherein said medium comprises a pair of transmission lines, said first, second and third transmission monitors,, timer, and transmitters acting independently on each of said transmission lines.

13. A method for arbitrating at a node among a plurality of nodes for control of a network medium for transmission, said node having a physical location and a logical address on said medium, said method comprising the steps of:

determining a number of time slots for said node to monitor said medium, said number a function of the count of said plurality of nodes;

initiating a token-based arbitration scheme, always and immediately following the end of a transmission on said medium, said token-based arbitration scheme including dividing said medium into said number of time slots;

assigning one of said number of time slots to said node according to its logical address; and transmitting in said one time slot if no request for control of said medium is detected in any of said time slots preceding said one time slot and if an internal transmission request is received before the end of said time slot; and switching to a contention-based arbitration scheme at the same time as the rest of said plurality of nodes, always and immediately following said number of time slots, if no request for control of said medium is detected in any of said number of time slots.

14. An apparatus for arbitrating at a node among a plurality of nodes for control of a network medium for transmission, said node having a physical location and a logical address on said medium, said apparatus comprising:

a first controller, coupled to said medium, for initiating a token-based arbitration scheme, always and immediately following the end of a transmission on said medium, said token-based arbitration scheme including dividing said medium into a number of time slots for said node to monitor said medium, said number a function of the count of said plurality of nodes;

assigning one of said number of time slots to said node according to its logical address; and transmitting in said one time slot if no request for control of said medium is detected in any of said time slots preceding said one time slot and if an internal transmission request is received before the end of said time slot;

a second controller, coupled to said medium, for switching to a contention-based arbitration scheme at the same time as the rest of said plurality of nodes, always and immediately following said number of time slots, if no request for control of said medium is detected in any of said number of time slots; and a third controller for effecting said contention-based arbitration scheme.

* * * * *